US008631161B2

(12) United States Patent
Lavrov et al.

(10) Patent No.: US 8,631,161 B2
(45) Date of Patent: Jan. 14, 2014

(54) COMPUTER PROGRAM PRODUCT, SYSTEM AND METHOD FOR FIELD MANAGEMENT AND MOBILE INSPECTION

(76) Inventors: Andrei B. Lavrov, Reston, VA (US);
Anatoliy V. Tishin, Reston, VA (US);
Christopher D. Ramsey, Chevy Chase, MD (US)

( * ) Notice: Subject to any disclaimer, the term of this patent is extended or adjusted under 35 U.S.C. 154(b) by 427 days.

(21) Appl. No.: 12/570,849

(22) Filed: Sep. 30, 2009

(65) Prior Publication Data
US 2010/0082842 A1    Apr. 1, 2010

Related U.S. Application Data

(60) Provisional application No. 61/136,742, filed on Sep. 30, 2008.

(51) Int. Cl.
*G06F 15/16* (2006.01)

(52) U.S. Cl.
USPC .......................................... 709/248

(58) Field of Classification Search
USPC ................................. 709/248, 250
See application file for complete search history.

(56) References Cited

U.S. PATENT DOCUMENTS

| | | | | |
|---|---|---|---|---|
| 5,856,931 | A * | 1/1999 | McCasland | 702/182 |
| 7,239,877 | B2 * | 7/2007 | Corneille et al. | 455/456.3 |
| 7,593,751 | B2 * | 9/2009 | Barbosa et al. | 455/556.1 |
| 2001/0042078 | A1 * | 11/2001 | Anwar | 707/500 |
| 2003/0069716 | A1 * | 4/2003 | Martinez | 702/188 |
| 2003/0178485 | A1 * | 9/2003 | Lee | 235/435 |
| 2004/0128613 | A1 * | 7/2004 | Sinisi | 715/500 |
| 2005/0125085 | A1 * | 6/2005 | Prasad et al. | 700/83 |
| 2007/0283049 | A1 * | 12/2007 | Rakowski et al. | 709/246 |
| 2008/0189439 | A1 * | 8/2008 | Chitre et al. | 709/248 |
| 2008/0256174 | A1 * | 10/2008 | Toivonen | 709/203 |

* cited by examiner

*Primary Examiner* — Jason Recek
(74) *Attorney, Agent, or Firm* — PCT Law Group, PLLC

(57) ABSTRACT

Disclosed herein is a computer program product, system and method to provide field management and mobile inspection via an online platform web-application for use by construction and capital projects management and property management firms and their subcontractors/vendors. More particularly, in an aspect, use of an automated field management process includes a terminal-based solution (i.e., a Tablet-PC) for field-based personnel that synchronizes with a server for office personnel and dynamically generates field management documents, reports and other information. In further aspects, field management resources may be generated that are context-specific. A visual punch list may be generated using area plans and special codes to facilitate automated field management processes. Rules may be pre-established by users to expedite field management processes. Data records may be synchronized among multiple mobile terminals and at least one server.

36 Claims, 5 Drawing Sheets

COMPUTER PROGRAM PRODUCT, SYSTEM AND METHOD FOR FIELD MANAGEMENT AND MOBILE INSPECTION

CROSS REFERENCE TO RELATED APPLICATIONS

This application claims the benefit of U.S. Provisional Patent Application No. 61/136,742 entitled "Computer Program Product for Field Management and Mobile Inspection", filed on Sep. 30, 2008 by Andrei Lavrov et al., the content of which is incorporated herein by reference in its entirety.

BACKGROUND OF THE INVENTION

1. Field of the Invention

The present invention generally relates to field management, and more particularly to systems, methods and computer program products for assisting construction and capital project companies in reducing project costs and risks.

2. Related Art

In today's business climate, construction management firms engaged in medium and large projects (e.g., sport stadiums, hospitals and healthcare facilities, office buildings, power plants, manufacturing facilities, airports, seaports and railway terminals, multi-unit residential complexes, etc.) have to manage large teams of highly-trained construction professionals and specialists to ensure that partnering, estimating, purchasing, scheduling, engineering, and safety and community relations all go smoothly to produce quality projects. Further, the owners of such projects often require fast completion in order to have the structures resulting from these projects occupied and thus producing revenue. Maintenance of such complex structures by owners during their entire life also requires similar needs for managing large teams of professionals and specialists to ensure smooth operations of capital structures and related infrastructures (e.g., electrical system, plumbing systems, air conditioning equipment, power systems, etc.).

Conventionally, coordinating such large teams involves a lot of paperwork, including documents and documentation. This is especially true in performing field management, punch list management, quality, commissioning, turn-over and safety management, and warranty- and maintenance-related functions. Consequently, construction management and property management firms have sought processes that keep their managers and subcontractors on the job site working (i.e., building and maintaining), rather than in an office shuffling papers. Field management documents include, but are not limited to, field inspections, punch lists, vendor lists, resource lists, task lists etc.

Along with the need to keep construction mangers and subcontractors on the job site rather than in office is a parallel need for synchronization of data between the terminals used by field personnel, a host server or web site, and the terminals operated by managers and supervisors. Data pertaining to particular processes or tasks must be kept synchronized in order to avoid work duplication, unnecessary communications, and other cost-increasing problems. U.S. Patent Publication No. 2006/0123010 to Landry et al., published Jun. 8, 2006, generally discloses a system of synchronizing data in distributed networks. What is needed, however, is data synchronization that is optimized for use in field management particularly for construction and other capital projects.

Given the foregoing, what are needed are systems, methods and computer program products for providing mobile field software that assists construction companies and property management firms in field management activities and facilitates mobile inspections.

BRIEF DESCRIPTION OF THE INVENTION

The present invention meets the above-identified needs by providing systems, methods, and computer program products for business process automation of field and jobsite management, quality inspections and control, safety management, commissioning and production tracking.

In an aspect, the present invention provides a computer program product for field management that improves field operations, customer relationships, enhances partner collaboration and creates efficiencies across company supply chains and business operations for a construction and capital project management firm. In such an aspect, the present invention provides a central server side application and a mobile PC-based-side application that offers seamless integration of field service data with project management and accounting, purchasing and subcontractor management and reporting. A method of field management using a computer is disclosed, the computer being programmed to perform a method comprising (1) receiving a request for an automated field management process via a communications interface; (2) generating at least one field management resource via processor and memory; (3) receiving data associated with said at least one field management resource via said communications interface; (4) analyzing said data and said at least one field management resource via said processor and memory; (5) reporting at least one issue via said communications interface; and (6) generating at least one field management report via said processor, memory and communications interface.

An advantage of the present invention is that it can be used to streamline the quality management process, facilitate inspections in newly-built or existing structures and areas of construction projects, improve quality and efficiency of inspections and improve reliability of field data.

Another advantage of the present invention is that it provides automated inspection handling, allowing different types of inspection in electronic format to be conducted. That is, the present invention allows automatic generation of inspection checklists and templates depending on locations of actual inspecting objects and configuration of construction areas and locations as well as depending on current stages of construction.

Another advantage of the present invention is that it allows for context-specific generation of checklists, templates and issue lists.

Another advantage of the present invention is that it allows automation of conducting inspections of various disciplines (e.g., electrical work, plumbing, concrete, etc.) during one inspection event. The invention allows the use of special codes to assist in identifying tasks, information templates and responses, checklist items, report elements etc.

Another advantage of the present invention is that it allows automated deficiencies or issues handling by allowing mobile users (i.e., those in the field) to create issues using just a few clicks. The invention allows users to illustrate and document deficiencies using a combination of image files (made with attached digital photo camera), project documents and drawings, visual markups of documents and textual descriptions.

Another advantage of the present invention is that it provides tools that allow users to enter textual information with "one click" by placing standard information templates into fields on various electronic forms.

Another advantage of the present invention is that it distributes (and tracks) reports on deficiencies to vendors automatically (i.e. on the server side) using rule sets customizable by users.

Yet another advantage of the present invention is that it allows users to set up automated workflows for tracking and correcting deficiencies based on customizable statuses of deficiencies and issues. The present invention allows users to update statuses of deficiencies via server application or via mobile client applications.

Yet another advantage of the present invention is that it includes tabular, textual and graphical reporting features such that reports may be generated for control quality management.

Yet another advantage of the present invention is that it assists construction management firms in reducing project costs, time and risks through elimination of redundancy, enhanced collaboration among project participants, and analysis of project performance.

Yet another advantage of the present invention is that it assists with synchronization and two-way exchange of data between server application and multiple mobile clients. The invention has the ability to minimize data synchronization time by optimizing and compressing data to be transmitted, to resolve conflicts with data entered and modified concurrently by multiple users, and to perform synchronization by multiple mobile users simultaneously. A further advantage is that use of multiple data timestamps reduces the quantity of data that participates in a synchronization process.

Further features and advantages of the present invention, as well as the structure and operation of various aspects of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

Figure 1:
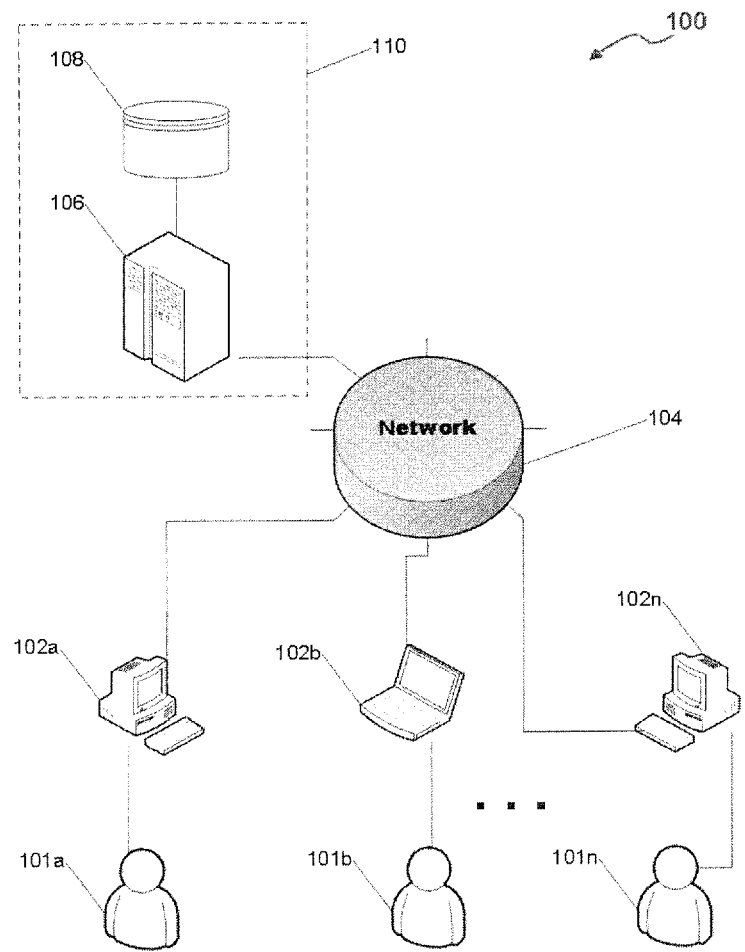
FIG. 1 is a block diagram of an exemplary environment for providing field management and facilitating mobile inspections according to an aspect of the present invention.

The present invention is directed to systems, methods and computer program products for providing field management and facilitating mobile inspections.
Introduction In an aspect, the present invention provides an online platform web-application for use by construction management and property management firms and their subcontractors/vendors. Accordingly, in such an embodiment, the present invention optimizes every aspect of field operations, improving performance and effectiveness of mobile workers.

In an aspect, the present invention is directed to an application consisting of two main computing parts—a server part and a terminal part—that may operate independently. In a preferred aspect, a terminal may including a Tablet PC for field-based personnel that synchronizes with a central server web-based solution for office personnel and dynamically generates work-orders to be sent via fax and e-mail in several languages to subcontractors.

The terminals may be synchronized with a server on a regular basis to make data records consistent and up-to-date. In a synchronization process, data record changes may be propagated from one terminal to another, via a server. In an aspect, such synchronization is based on a data record replication mechanism where all the necessary data records are transmitted to client terminals in advance. The replication mechanism then assumes that all the terminal users may work "off-line" and go "on-line" only to connect to a server to "sync." Terminal users may modify or delete existing data records and add new data records to the replicated data records in the course of their field work. All user-made modifications and replication of new data records may take place during next synchronization. Synchronization also may be used to initialize any newly-installed terminal version of the application and to recover forgotten passwords on the terminals.

In an aspect, the application includes modules for such important areas of Field Management, Punch List Management, Quality Management and Control, Warranty and Maintenance, Commissioning, Turn-over, and Safety Management.

In an aspect, the application may automatically generate context-specific field management documents, i.e., a checklist. When a new inspection is created by a user, a checklist is generated to guide the user through the inspection. The checklist may contain location or task-specific information, required materials, suggested tools, vendor information and the steps required to carry out each component of the inspection. When completed, in an aspect, the application may assist with the generation of a field management report detailing the results of the inspection. A field management report may include recommendations on fixes, repairs or next steps, and may further include standard information templates.

In an aspect, field management includes the ability to perform the following functions:
Complete daily reports, daily work journal, meeting minutes, and more:
Completing reports on terminals in the field improves accuracy and saves time by eliminating the need to retype manual/paper forms.
Complete Requests for Information (RFIs):
RFIs are drawn up in the field and sent via e-mail immediately upon synchronization completion. The elimination of lag time improves efficiency and allows you to respond in a timely manner.
Complete quality inspections and perform quality control:
Quality inspections can be conducted on terminals in the field either offline or online streamlining inspections management.
Complete safety inspections:
Safety inspections can be conducted on terminals in the field either offline or online streamlining safety management.
Mark up drawings and plans:
Mark up drawings and plans and attach them to reports instantly.

Auto-generate reports and notices:
: The terminal-side application generates reports automatically, eliminating copying, filling in, retyping and faxing.

Customize routing for approvals:
: Set workflows for each project for inspections and reports.

Work offline or online with a terminal:
: The terminal-side application does not require an internet connection.

Customize application to business processes:
: Change inspections and reports to a preferred format and workflow.

In an aspect, field management includes the ability to perform the following functions at an office or work setting:

Receive up-to-the-minute field reports:
: Instant communications allows for quick identification and early response to critical issues from the field.

Schedule inspections and track deficiencies across multiple projects:
: All reports across multiple projects can be accessed through the application server.

Receive inspections for review, approval or routing:
: Streamline the approval process to manage reports more efficiently with a central document control system.

Assign a subcontractor to deficiencies and generate work orders:
: The process of generating work orders and assigning a subcontractor to deficiencies may be complete in just a few clicks or completely automatic based on user-defined rules.

Generate, access, and distribute project or inspection reports:
: Allows project reports and inspection reports to the centrally organized quickly and easily from the field.

In an aspect, field management includes the ability to manage punch lists, illustrated with the following functions:

Manage thousands of punch list items seamlessly:
: Replaces cumbersome Excel spread sheets or paper-based processes with a centralized database.

Create and update punch lists:
: Offers a paperless solution of punch lists on terminals to improve accuracy and efficiency by avoiding the lag time caused by retyping.

Attach Images/Photos to deficiencies

Mark up drawings and plans:
: Mark-up drawings and plans and instantly attach them to punch lists.

Auto-generate and distribute reports:
: The terminal-side application automatically generates and distributes reports in the field right after inspection.

Record detailed history for deficiencies:
: Deficiencies recorded by each field personnel are synchronized multi-directionally. Consolidation of schedule, inspection, and report provides users with total solutions for punch lists management.

Automatic alerts for critical issues:
: Automatic alerts make users aware of issues requiring follow-up.

Automated punch list process:
: Because punch lists are conducted on terminals directly in the field, photos can be marked up, embedded with a time stamp, and attached to the report without ever having to go to the office.

In an aspect, managing punch lists includes the ability to perform the following functions at an office or work setting:

Pre-define a library of deficiencies:
: Predefining deficiencies standardizes a common language among the project participants decreasing confusion stemming from lack of clear criterion.

Establish deficiencies severity know which should come first:
: By establishing the level of severity, users can prioritize tasks.

Schedule and track punch lists across multiple projects:
: All punch lists across multiple projects can be accessed through the application server.

View punch lists by subcontractor, location, or status:
: All punch list items can be sorted by subcontractor, location, or status to monitor and analyze the projects.

Instantly communicate between the jobsite and the construction office

In an aspect, field management includes the ability to manage quality and quality control, illustrated with the following functions:

Work offline or online with a terminal:
: Conduct inspections anywhere, even in areas without any Internet access.

Link (Chain) inspections and/or forms:
: Link certain inspections and/or forms to manage and track inspections better.

Customize the application to user-specific business process:
: Change inspections and reports to a preferred format and workflow.

Capture digital signatures with sophisticated hand-writing recognition:
: Embedded time stamps and digital signatures allow users to maintain legal records.

Schedule and dispatch resources from the field directly

Auto-generate reports and notices:
: Auto-generation of reports eliminates the need for copying, filling in, retyping and faxing.

Automate quality inspections:
: Because inspections are conducted on terminals directly in the field, photos can be marked up, embedded with time stamp, and attached to the report without ever having to go to the office.

Mark-up drawings and plans and instantly attach them to issue reports.

Attach Images/Photos to deficiencies

Synchronize data with the back office wirelessly:
: The applications multi-directional synchronization allows users to always have the latest project information.

Automatic alerts for critical issues:
: Automatic alerts notify you of issues requiring follow-up.

In an aspect, field management includes the ability to manage quality and quality control, illustrated with the following functions in an office or work setting:

Customize inspection checklists and forms to optimize operations.

Customize routing for approvals:
: Set workflows for each project for inspections and reports.

Pre-define a library of deficiencies:
: Predefining deficiencies standardizes a common language among the project's participants, decreasing confusion stemming from lack of clear criterion.

instantly communicate between the field and office.

In an aspect, field management includes the ability to manage safety, illustrated with the following functions:
Work offline or online with a terminal:
Conduct inspections anywhere, even in areas without any Internet access.
Link (Chain) inspections and/or forms:
Link certain inspections and/or forms to manage and track inspections better.
Customize the application to user-specific business process:
Change inspections and reports to a preferred format and workflow.
Capture digital signatures with sophisticated hand-writing recognition:
Embedded time stamps and digital signatures allow users to maintain legal records.
Schedule and dispatch resources from the field directly
Auto-generate reports and notices:
Auto-generation of reports eliminates the need for copying, filling in, retyping and faxing.
Automate safety inspections and forms:
Because inspections are conducted on terminals directly in the field, photos can be marked up, embedded with time stamp, and attached to the report without ever having to go to the office.
Attach Images/Photos to deficiencies
Synchronize data with the back office wirelessly:
The applications multi-directional synchronization allows users to always have the latest project information.
Automatic alerts for critical issues:
Automatic alerts notify you of issues requiring follow-up.
In an aspect, field management includes the ability to manage safety, illustrated with the following functions in a work or office setting:
Customize safety inspection checklists and forms to optimize operations.
Customize routing for approvals:
Set workflows for each project for inspections and reports.
Pre-define a library of deficiencies:
Predefining deficiencies standardizes a common language among the project's participants, decreasing confusion stemming from lack of clear criterion.
Instantly communicate between the field and office.
In an aspect, field management includes the ability to manage warranties and maintenance, illustrated with the following functions:
Record and track claims and work orders:
The ability to work on terminals both offline and online eliminates the need to retype and rearrange punch lists and photos after coming back to the office.
Schedule and dispatch resources:
Resources are scheduled to deliver and ordered to dispatch from the field on terminals.
Access building records/plans:
Access detailed records and plans anytime from anywhere.
Schedule inspections automatically and notify customers by e-mail:
The application automates the process of inspection ensuring the implementation of inspections.
Capture digital signatures:
Embedded time stamps and digital signatures maintain legal records eliminating the need to print signed reports.
Capture and store on-site photos of deficiencies:
Photos can be marked up, embedded with time stamp and attached to the report.
In an aspect, field management includes the ability to manage warranties and maintenance, illustrated with the following functions in a work or office setting:
Customize inspection checklists and forms to optimize operations:
Set up routine maintenance:
The application streamlines warranty and maintenance processes with scheduled routine maintenance.
Access building records/plans:
Access to detailed records and plans anytime from anywhere.
Create original workflows for emergency claims
Assign specific warranty issues to subcontractors:
Eliminate repetitive work by linking and assigning specific issues to subcontractors.
Create customer service portal The present invention is now described in more detail herein in terms of the above exemplary contexts. This is for convenience only and is not intended to limit the application of the present invention. In fact, after reading the following description, it will be apparent to those skilled in the relevant art(s) how to implement the following invention in alternative aspects.

System Overview

FIG. 1 presents an exemplary environment diagram 100 of various hardware components and other features in accordance with an aspect of the present invention. As shown in FIG. 1, in an aspect of the present invention, data and other information and services are, for example, input by one or more users 101 (shown as users 101a-n in FIG. 1) and received by one or more terminals 102 (shown as terminals 102a-n in FIG. 1), such as a personal computer (PC), mini-computer, laptop, tablet PC, palmtop, microcomputer, telephone device, mobile device, personal digital assistant (PDA), or other device having a processor, memory and input and display capability. In a preferred aspect, terminal 102 is a one of many commercially-available tablet PCs, notebook PCs or convertible notebook PCs that can be used as tablet PCs suitable for a construction jobsite where shock, extreme heat, cold, direct sunlight, dust, and rain are expected. Rugged, semi-rugged, and non-rugged tablet PCs—such as the Panasonic Toughbook, the Itronix GoBook, the Motion-Computing F5 and the Xplore Technologies iX104C2—typically offer the ability to enter data using an electronic pen, built-in software keyboard, regular external keyboard, mouse and voice dictation, and may be equipped with a digital camera. Such tablet PCs typically include the ability to program pen-activated shortcuts for complex information entry as in, for example, filling out an electronic form or report.

It should be understood that the term "data" means any information used in an aspect. Examples include, but are not limited to, input data by users, task data, checklist data, punch list data, standard templates or other standard information, standard report elements, data records, alerts and messages, system overhead information or other internal communications, etc.

Within system 100, terminal 102 is coupled to a server 106, such as a PC, mainframe computer, server computer, or other device having a processor and a repository for data 108 or connection to a repository for maintaining data 108, via a network 104, such as the global, public Internet, via (wired or wireless) network couplings. In an aspect, network 104 may supply the necessary network couplings continuously or on an as-needed basis.

As will be appreciated by those skilled in the relevant art(s) after reading the description herein, in such an aspect, the central server side application executes on server 106 and the terminal-based-side application is installed and executes on terminals 102. As will also be appreciated by those skilled in the relevant art(s) after reading the description herein, in such an aspect, a service provider may allow access, on a free registration, paid subscriber and/or pay-per-use basis, to the tool via one or more World-Wide Web (WWW) sites that may be on network 104. Thus, system 100 is scaleable such that multiple construction management firms and other like organizations may utilize it to allow their respective users to create, send, review and receive information, and generally interact with one another via system 100.

As will also be appreciated by those skilled in the relevant art(s), in an aspect, various (login, admin, account, information, resource, logout, registration, help, communications, etc.) screens would be generated by server 106 in response to input from user 101 over network 104. That is, in such an aspect, server 106 is a typical Web server running a server application at a Web site which sends out Web pages in response to Hypertext Transfer Protocol (HTTP) or Hypertext Transfer Protocol Secured (HTTPS) requests from remote browsers being used by users 101. Thus, server 106 may provide a graphical user interface (GUI) to users 101 of system 100 in the form of Web pages. These Web pages may be sent to terminals 102, and would result in the GUI being displayed.

Additional aspects include use of short-cuts within a GUI at terminals 102 in order to expedite field management processes. In such an aspect, short-cuts may assist in completing forms, checklists, punch lists, or assist in preparing field management reports or responding to field issues.

As will also be appreciated by those skilled in the relevant art(s) after reading the description herein, alternate aspects of the present invention may include providing the tool for providing field management and facilitating mobile inspections thereby enabling the management of construction projects on an application service provider (ASP) model or as an enterprise model wherein all the components of system 100 are connected and communicate via a single inter-corporate wide area network (WAN) or local area network (LAN) for use by a single construction management firm or like organization.

Computing Environment

The present invention (i.e., system 100, the methods of providing field management and facilitating mobile inspections thereby enabling the management of construction projects of the present invention, or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 2:
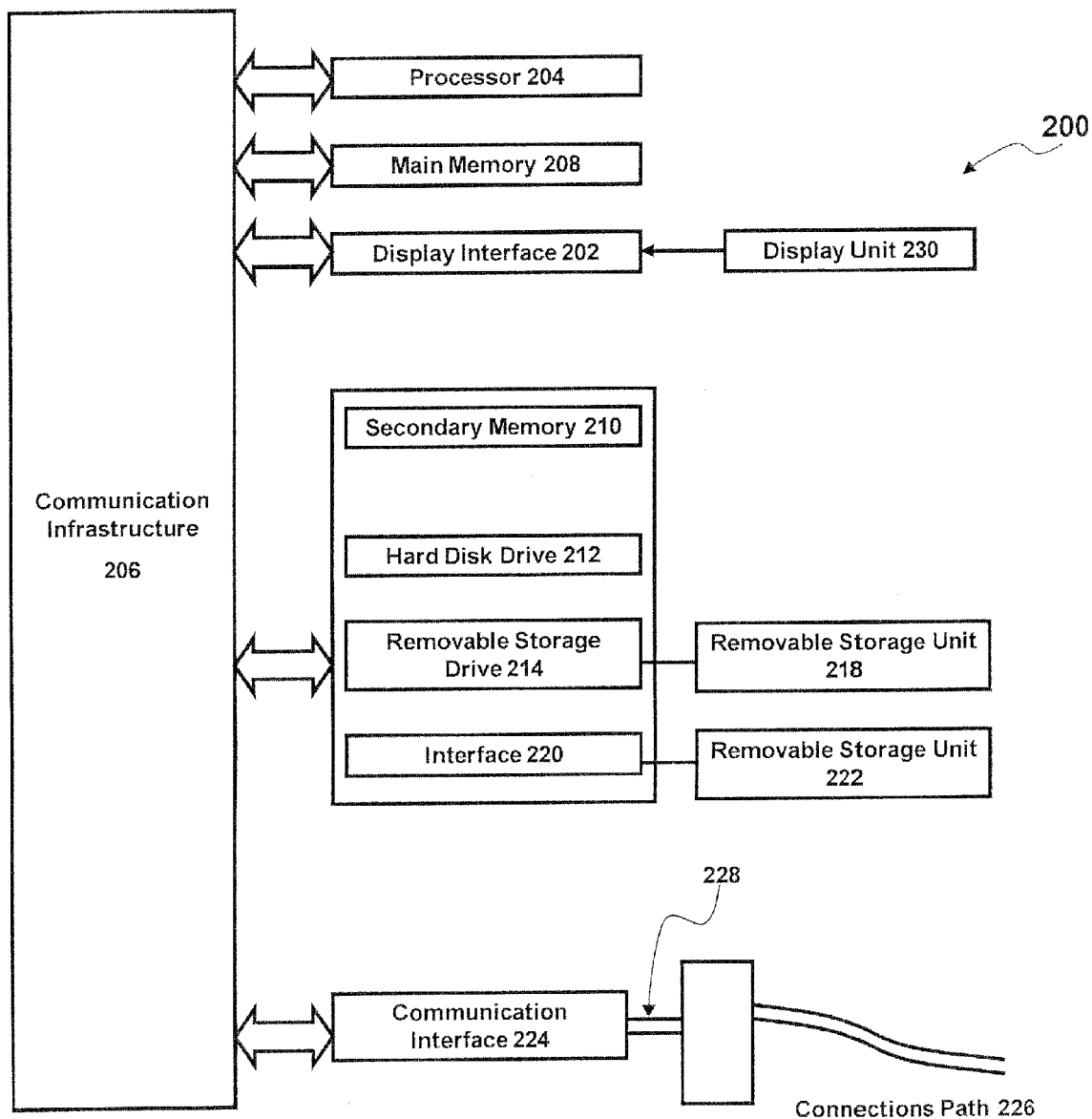
FIG. 2 is a block diagram of an exemplary computer system useful for implementing the present invention.

In fact, in one aspect, the invention is directed toward one or more computer systems capable of carrying out the functionality described herein. An example of a computer system 200 is shown in FIG. 2.

Computer system 200 includes one or more processors, such as processor 204. Processor 204 is operably connected to communication infrastructure 206 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 200 may include display interface 202 that forwards graphics, text, and other data from communication infrastructure 206 (or from a frame buffer not shown) for display on display unit 230.

Computer system 200 also includes main memory 208, preferably random access memory (RAM), and may also include secondary memory 210. Secondary memory 210 may include, for example, a hard disk drive 212 and/or removable storage drive 214, representing a floppy disk drive, a magnetic tape drive, an optical disk drive, etc. Removable storage drive 214 reads from and/or writes to removable storage unit 218 in a well known manner. Removable storage unit 218 represents a floppy disk, magnetic tape, optical disk, etc. which is read by and written to by removable storage drive 214. As will be appreciated, removable storage unit 218 includes a computer usable storage medium having stored therein computer software and/or data.

In alternative aspects, secondary memory 210 may include other similar devices for allowing computer programs or other instructions to be loaded into computer system 200. Such devices may include, for example, a removable storage unit 222 and interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228 which may be electronic, electromagnetic, optical or other signals capable of being received by communications interface 224. These signals 228 are provided to communications interface 224 via a communications path (e.g., channel) 226. This channel 226 carries signals 228 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 214, a hard disk installed in hard disk drive 212, and signals 228. These computer program products provide software to computer system 200. The invention is directed to such computer program products.

Computer programs (also referred to as computer control logic) are stored in main memory 208 and/or secondary memory 210. Computer programs may also be received via communications interface 224. Such computer programs, when executed, enable computer system 200 to perform the features of the present invention, as discussed herein. In particular, the computer programs, when executed, enable processor 204 to perform the features of the present invention. Accordingly, such computer programs represent controllers of computer system 200.

In an aspect where the invention is implemented using software, the software may be stored in a computer program product and loaded into computer system 200 using removable storage drive 214, hard drive 212 or communications interface 224. The control logic (software), when executed by processor 204, causes processor 204 to perform the functions of the invention as described herein.

In another aspect, the invention is implemented primarily in hardware using, for example, hardware components such as application specific integrated circuits (ASICs). Implementation of the hardware state machine so as to perform the functions described herein will be apparent to persons skilled in the relevant art(s).

In yet another aspect, the invention is implemented using a combination of both hardware and software.

Illustrative Methods

Figure 3:
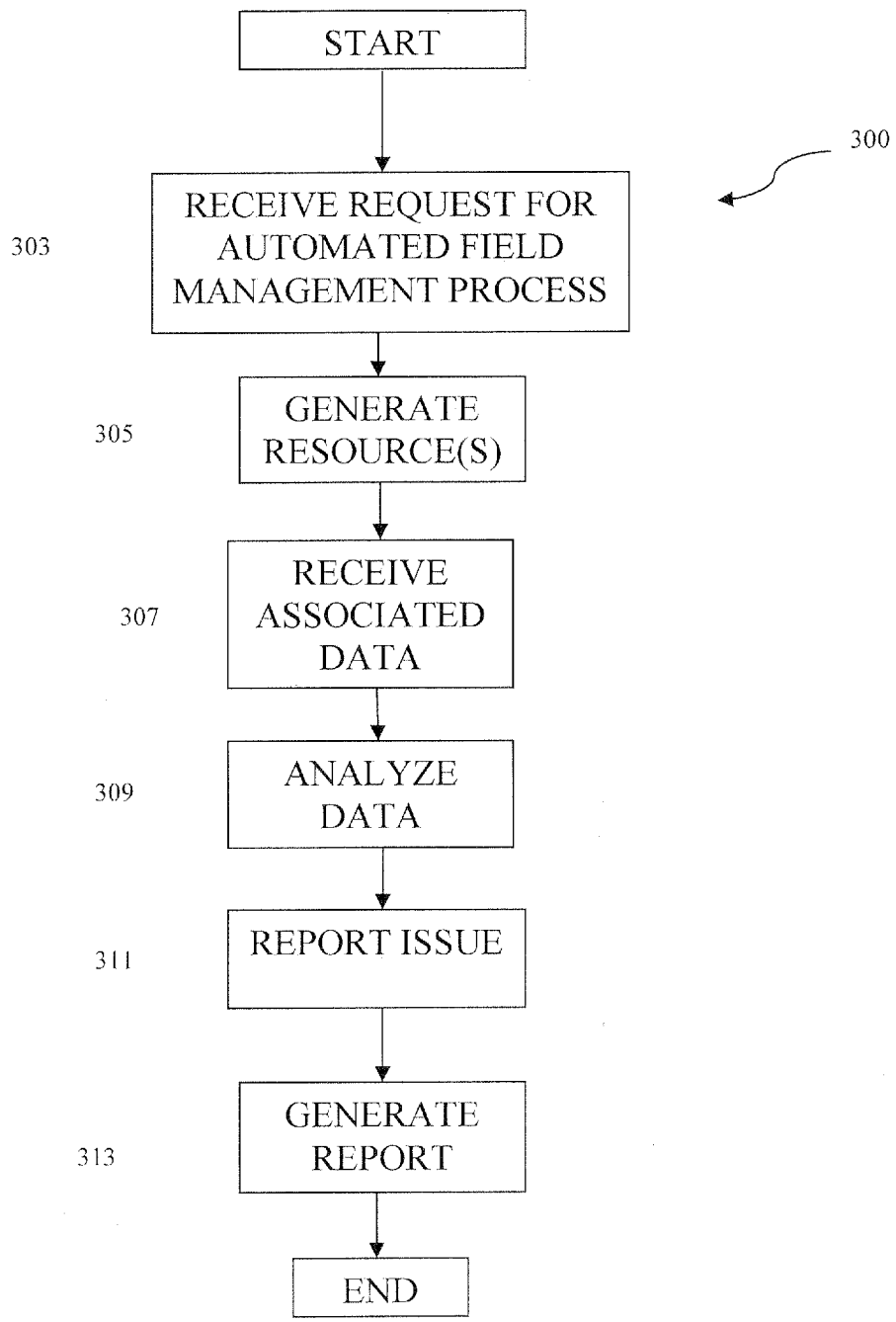
FIG. 3 is a flowchart illustrating an exemplary automated field management process method using an aspect of the present invention.

In an aspect, FIG. 3 illustrates an exemplary field management method 300 according to an aspect of the present invention. In such an aspect, a request for an automated field management process is received at step 303. The request for an automated field management process 303 may include, but not be limited to, beginning an automated field management process or continuing an automated field management process. In an aspect, one or more users may have previously contributed to the request for an automated field management process 303. An automated field management process may include, but not be limited to, an inspection including a request for information (RFI), field issue resolution, punch list completion, form completion etc. In an aspect, a request for an automated field management process may include requesting a field management document. In such an aspect, a field management document may include, but not be limited to, an inspection document, checklist, punch list, issue list, area plan, floor plan or other document associated with field management. In an aspect, a request may be received by a user operating a terminal. In such an aspect, the terminal may be networked and disposed in communications with a host server or web site. In an aspect, the field management document may be updated by one or more users. In an aspect, an ID is associated with an automated field management process. In an aspect, an ID is associated with an automated field management document.

In an aspect, at step 305, one or more field management resources may be generated. A field management resource may be generated on a remote computing device or via networked connection with server 106 according to an aspect. In an aspect, a field management resource may be generated at any time or at a scheduled time. In such an aspect, a field management resource may be generated from a list of field management resources or from a calendar application scheduling field management resources. A field management resource may be generated on behalf of a different user on the system. Generating a field management resource may comprise retrieving one or more field management resources from memory in terminal 102 or server 106. A field management resource may include, but not be limited to, form templates, special code lists, standard information templates, media such as photos, video and text or web pages, data objects from previously conducted field management processes, metrics and guidelines relevant to the requested field management process 303, etc.

At step 307, field management data associated with the information obtained in steps 303 and 305 is received according to the input of one or more users. In an aspect, terminal 102 receives the field management data. In such an aspect, terminal 102 may receive field management data, optionally store the field management data and optionally forward to server 106. In such an aspect, field management data may be forwarded to one or more terminals 102 and one or more servers 106 as it is received or stored, then synchronized. In an aspect, field management data may be forwarded in real time or upon completion of a final task. In an aspect, field management data may be forwarded at a time of synchronization.

At step 309, field management data is analyzed. In an aspect, field management data may be analyzed to determine congruence with pre-established metrics or guidelines describing field management tasks or issues, and when such tasks or issues may be resolved, according to the metrics or guidelines. In such an aspect, a message may be provided to one or more users. In such an aspect, field management data representing the extent of congruence with pre-established metrics or guidelines may be added to the field management data, then forwarded as it is received or stored, then synchronized, according to an aspect. In an aspect, analysis of field management data may include selection of a form template and population of all required data fields and optional data fields.

At step 311, one or more issues may be reported. An issue may include, by is not limited to, a deficiency, note or other information item associated with requested automated field management process 303. Information from steps 307 and 309 may used to prepare such a report, in an aspect. In such an aspect, standard information templates associated with particular field management data may be employed that facilitate reporting of an issue. An issue may include, without limitation, a note or deficiency. In such an aspect, pre-established metrics or guidelines may be combined with information from steps 307 and 309 to generate graphs, diagrams, area maps etc. as part of issue report 413.

At step 313, a field management report is generated. In an aspect, information used in steps 307, 309 and 311 may be used to generate a field management report for the automated field management process requested at step 303. A field management report may use pre-established metrics or guidelines as well as standard information templates.

Figure 4:
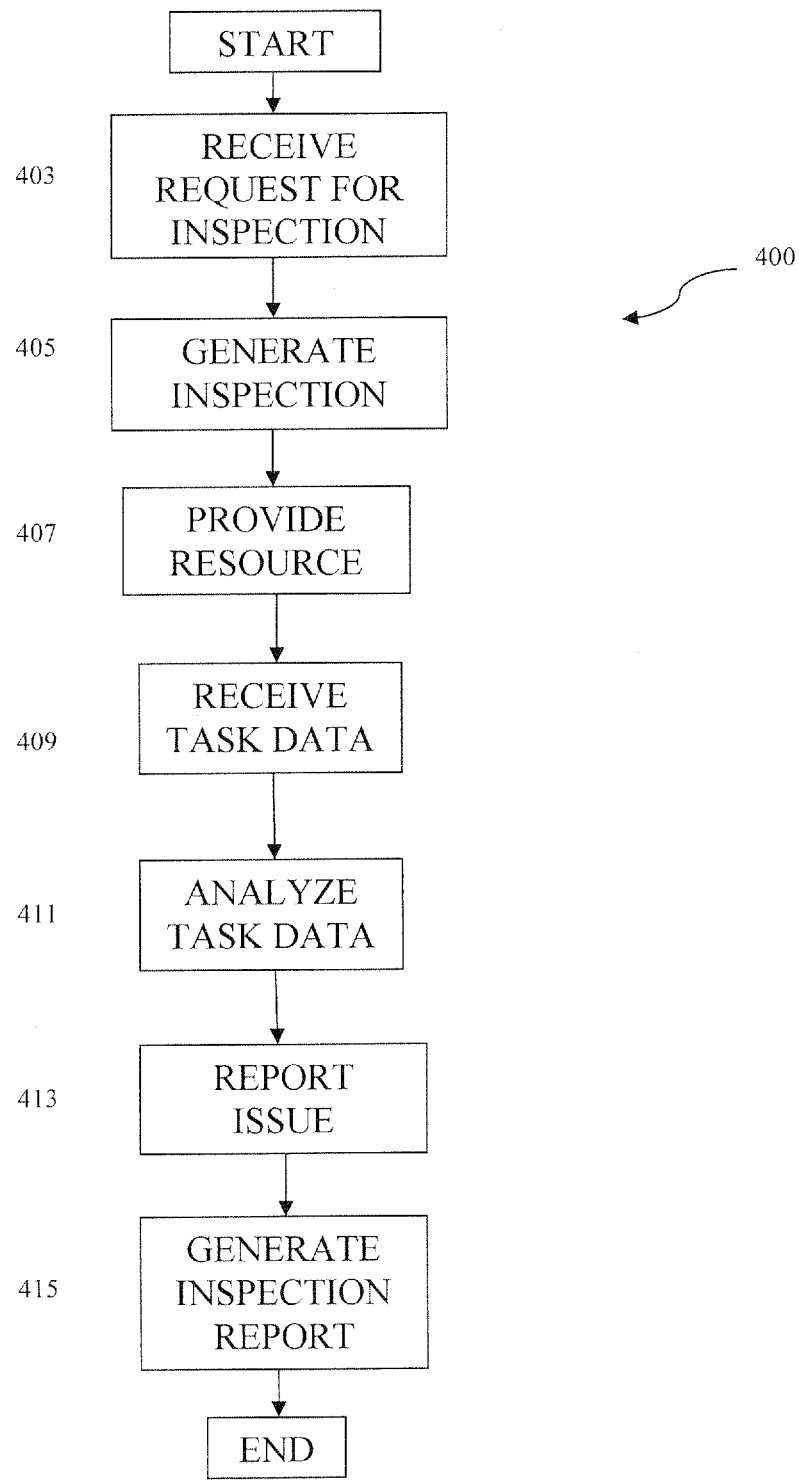
FIG. 4 is a flowchart illustrating an exemplary inspection method for using an aspect of the present invention.

In an aspect, FIG. 4 illustrates an exemplary inspection method 400 using an aspect of the present invention. In an aspect, a request for inspection is received at step 403. In such an aspect, a request may be received by a user operating terminal 102. In such an aspect, terminal 102 may be networked and disposed in communications with server 106 using, for example, network 104. In an aspect, a request for inspection may include, but not be limited to, a request to resume conducting a partially completed inspection.

In an aspect, at step 405 an inspection may be generated. An inspection may be generated on terminal 102 or via networked connection with server 106 using, for example, network 104. In an aspect, the inspection may be generated at any time or at a scheduled time. In such an aspect, an inspection may be generated from a list of inspections or from a calendar application. In an aspect, an inspection may be generated on behalf of a different user on system 100.

At step 407 resources are provided that may be part of inspection request 403. In an aspect, resources may include, but are not limited to, checklists, checkboxes, descriptions, data items, information templates, report templates, histories etc. In such an aspect, information templates may include, but are not limited to, standard phrases or frequently occurring report information. Continuing, resources may be context-specific resources, providing user 101 with resources only for the particular inspection request 403. An inspection request 403 may be requested for a specific area or area plan as part of a construction or capital project. Context-specific resources may include, but not be limited to, forms, lists, materials and related resources associated only with the specific area or area plan being inspected pursuant to inspection request 403. For example, in an aspect, in response to a request for an electrical inspection of a specific area, the application may generate a list consisting solely of electrical items needing to be inspected that appear in that specific area.

At step 409 task data is received according to the user's instructions as the requested inspection is actually conducted. Examples of task data include, but are not limited to, data associated with inspection tasks, data that describes particular inspection tasks, data that describes an issue, data that describes a note, etc. In an aspect, terminal 102 may receive taskdata. In an aspect, terminal 102 may receive task data, optionally store task data and optionally forward to server 106. In such an aspect, task data may be forwarded to server 106 as it is received or stored, then synchronized. In an aspect, task data may be forwarded to server 106 in real time or upon completion of the final task. In an aspect, task data may be forwarded to server 106 at a time of synchronization. Terminal 102 may allow electronic pen-based shortcuts to facilitate receipt of task data.

At step 411 task data is analyzed. In an aspect, task data is analyzed to determine congruence with pre-established metrics or guidelines describing the tasks and when such tasks are completed satisfactorily, according to the metrics or guidelines. In such an aspect, a message may be provided to user 101. In such an aspect, data representing the congruence with pre-established metrics or guidelines may be added to the task data, then forwarded to server 106 as it is received or stored, then synchronized, according to an aspect.

At step 413 an issue report is generated. Data from steps 407 and 409 may be used to prepare such a report, in an aspect. In such an aspect, standard information templates associated with particular tasks or task data may be employed that facilitate generation of an issue report. An issue report may include, but not be limited, notes and deficiencies. In such an aspect, pre-established metrics or guidelines may be combined with data from steps 407 and 409 to generate graphs, diagrams, area maps etc. as part of a issue report. Without limitation, an issue report may include a report from any part of an inspection according to an aspect.

At step 415, an inspection report is generated. In an aspect, data obtained in steps 407, 409 and 411 may be used to generate an inspection report for the inspection generated at step 403. An inspection report may use pre-established metrics or guidelines as well as standard information templates.

In an aspect, standard information templates may be updated during a synchronization process. In such an aspect, pre-established metrics or guidelines may also be updated.

In an aspect, vendors may be associated with a task or group of tasks. In such an aspect, vendor-associated information may also be associated with a task or group of tasks.

Figure 5:
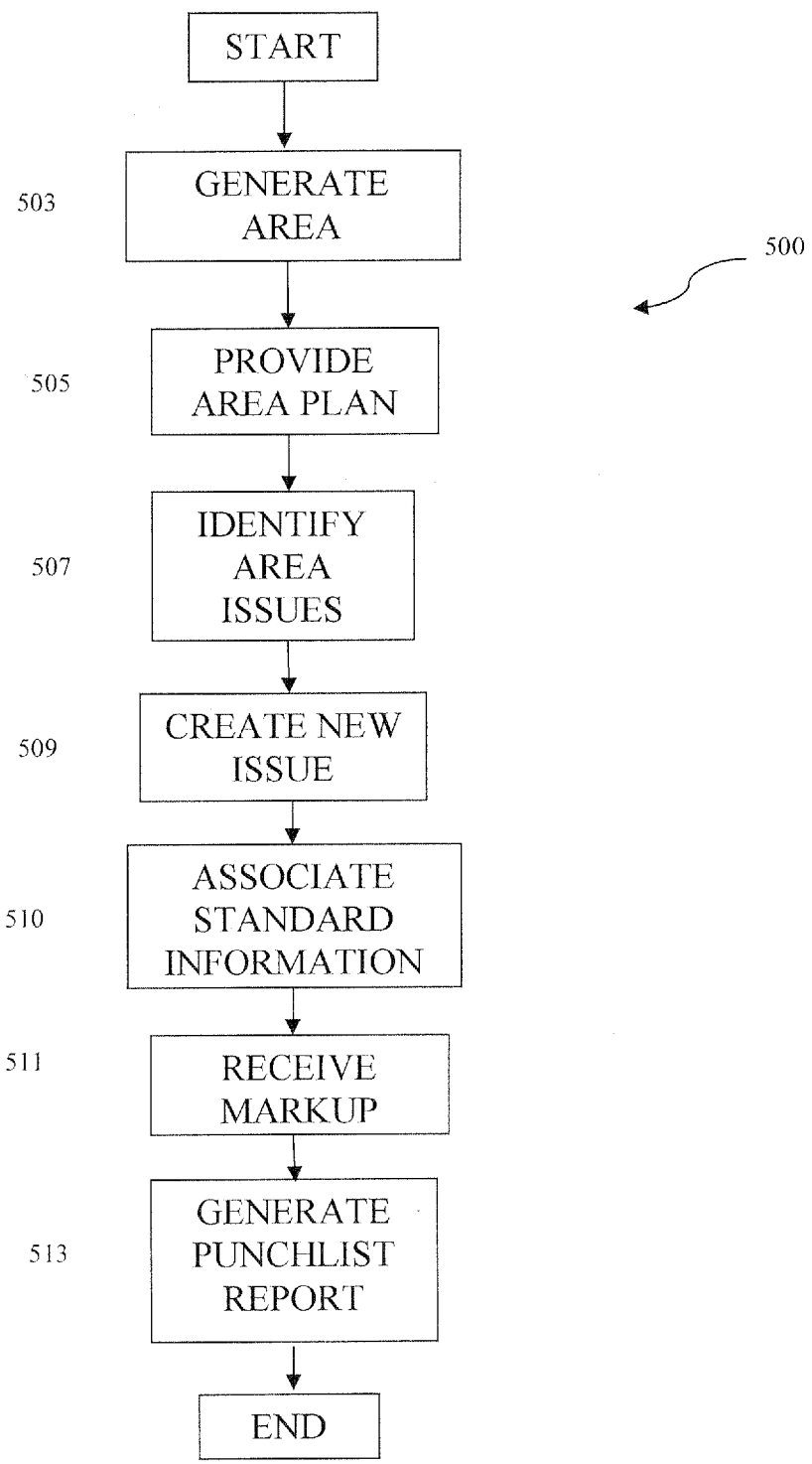
FIG. 5 is a flowchart illustrating an exemplary punch list method for using an aspect of the present invention.

Using FIG. 5 as an example, an exemplary illustrative punch list method 500 will now be described. At step 503 an area is generated from stored areas. In such an aspect, an area may be generated by user 101 operating terminal 102. In such an aspect, terminal 102 may be networked and disposed in communications with server 106.

In an aspect, areas may include, for example, areas of construction projects including, with no limitation, rooms, groups of rooms, floors, floor plans and groups of floors, buildings and outdoor landscapes, etc. In such an aspect, the area generated may have one or more associated punch lists.

At step 505 an area plan is provided. An area plan in an aspect may include one or more drawings or graphical renditions of an area generated at step 503. The area plan may be displayed on terminal 102. In an aspect, the area plan is interactive and may be edited by user 101. In an aspect, an area plan may be a floor plan. At step 507, area issues are identified with an area plan. In an aspect, area issues may include, but not be limited to, associated punch lists, descriptions, warnings, comments, vendors, materials, instructions and other information about the area and about any individual data item of a punch list or the area plan. In an aspect, a standard library of area issues may be used in whole or in part, wherein area issues may be represented with special codes. In such an aspect, standard libraries of area issues may be used for similar area plans 505. In an aspect, an area issue may be a standard issue. In such an aspect, a standard library may comprise standard issues. In an aspect, an ID is associated with each issue. In an aspect, identifying area issues is done visually with user 101 examining the display of a provided area plan 505. In such an aspect, the pen of a tablet-PC may mark area issues.

At step 509, new issues may be created. In an aspect, particular issues may be added to area issues 507 that may be unique or local to the punch list or area plan 505. In an aspect, when a new issue is created, it may be populated with standard issues and responses. A new issue may also be created visually by indication or markup, as described below, directly on a provided area plan 505.

At step 510, standard information may be associated with identified issues 507 and created issues 509. Special codes may be employed as a shortcut reference to associated standard information 510, expediting complex information entry and generally assisting user 101.

At step 511, area issues may receive a markup or other indications as the area issues are worked through. In an aspect, a checklist may be displayed with optional checkboxes or other information response items that may be selected. In an aspect, area issues may be a punch list template. In an aspect, photos, video may be included. In such an aspect, all issue information, including without limitation photos, checkboxes, standard text, related video may be saved and stored. In an aspect, a markup device may include using a pen, mouse or similar computer input device to make indications directly on area plan 505. In such an aspect, indications may be saved and stored. In an aspect, a markup may include an arrow, cloud, circle, callout etc. Once a markup is made on an area plan 505, information associated or required with the issue may be selected from a list of issues, which may include standard issues as well as context-specific issues. In such an aspect, special codes may be used to identify issues, responses or standard information templates.

At step 513 a punch list report is generated. In an aspect, a punch list report may include standard report templates. Special codes may be included in the markup of provided area plan 505. In an aspect, area issues are included in a punch list report together with any related issue information. In an aspect, reports may be generated according to user-established rules. In such an aspect, rules may include distribution of the report to interested parties. In an aspect, interested parties may be notified by email that a report is available. In such an aspect, notification occurs when the report is complete.

It should be understood that for any of the information and data used in exemplary punch list method 500 the information may be downloaded from server 106. It should be further understood that a punch list may be saved and restarted at a later time. In an aspect, a vendor may be associated with an area plan or area issue or markup.

In an aspect, synchronization of data records may be conducted between and among any of terminals 102 in use as well as with server 106. In an aspect, unsynchronized data records (i.e., data records to be synchronized) may be identified by inspection of one or more timestamps. Once identified, a synchronization start time is established. In an aspect, synchronization then occurs using at least one timestamp, and identifying data records that need synchronization. In such an aspect, data records needing synchronization may be ascertained by searching for data records that have changed since the time of the last and most recent synchronization. Actual synchronization may include updating data records of other terminals 102 that may used by the field management process.

In an aspect, data records may be synchronized using multiple timestamps. In an illustrative aspect, data records changed on a first terminal 102a may update other terminals 102 and server 106. In such an aspect, after synchronization of unsynchronized data records on second terminal 102b, the application may look for first terminal 102a data records to be included in a synchronization using timestamps representing the time first terminal 102a data record was last updated; the time of the last synchronization (in this example, the time of synchronization of second terminal 102b), and the time the data record was last updated on a server 106. It should be understood that the process as described above is illustrative only and different aspects may be implemented over possibly many terminals 102 and servers 106.

Continuing, a times amp may include the time of a synchronization start. In an illustrative aspect, a synchronization process may begin at a terminal 102 or a server 106. In a preferred aspect, a synchronization may proceed as follows. Unsynchronized data on first terminal 102a are synchronized with server 106 at time=A. Unsynchronized data records on second terminal 102b are synchronized with server 106 at time=B, with B>A. At this point all data records are synchronized. Data records on first terminal 102a are then updated or changed in the course of using an aspect of the present invention. Data records on second terminal 102b are then updated or changed in the course of using an aspect of the present invention. These data records are changed at time=C, at first terminal 102a, and time=D, at second terminal 102b, with D>C>B>A. In this illustrative aspect, second terminal 102b then synchronizes with server 106 at time=E, updating all records that have been changed between times B and E. At the completion of this synchronization, server 106 has updated data records from second terminal 102b but not updated data records from first terminal 102a. Continuing with this illustrative aspect, first terminal 102a then synchronizes with server 106 at time=F, with F>E, updating all records that have been changed between times A and F. At the completion of this synchronization, server 106 has updated data records from both second terminal 102b and first terminal 102a, and first terminal 102a receives updated data records from second terminal 102b. However, at this point, second terminal 102b does not yet have updated records from first terminal 102a. At the next synchronization originating at second terminal 102b, second terminal 102b receives updated data records from first terminal 102a. These data records will be determined by comparison of timestamps, so that data records from first terminal 102a that update second terminal 102b may consist solely of those data records that were updated between times E and F. In such an aspect, each data record may have two timestamps—one timestamp is the actual date and time when the data record was changed via any terminal 102 or server 106. A second timestamp may show the date and time when the data record was changed on server 106 during synchronization. For example, a data record may be selected for synchronization when a data record on server 106 is older than the same data record originating at a terminal 102 during synchronization or when manually created or changed via a user interface at server 106.

In an aspect, the time margin period is less than three minutes but more than zero. In an aspect, timestamps are stored at each terminal 102 as necessary for the operation of the above illustrative synchronization process thereby assuring that no data records will be left un-synched due to possibly overlapping synchronization sessions that may originate from other terminals 102.

In alternative aspects, an information template may be a super-template, comprising one or more field management processes within a single GUI. A user 101 may select a particular field management process, and upon completion, select a different process, all within the application GUI. Examples of a super-template include, but are not limited to, electrical, plumbing, HVAC inspection processes.

In a further alternative aspect, special codes may be used to expedite complex information entry. A special code may be a short-hand reference to a specific information template or standard information response, or issue. By way of example, without limitation, selecting a special code representing a particular information item may cause that information item to become part of a field management document, inspection or report.

In an alternative aspect, rules may be pre-established by user 101 prior to requesting a field management process. In such an aspect, rules may define the content of requested field management resources and documents, standard information templates, area plans, etc. Rules may also assist in generating field management reports by providing specific direction as to the various information and data items developed during a field management process. In a further aspect, rules may be developed during a field management process, stored and used for future and similar processes.

Conclusion

While various aspects of the present invention have been described above, it should be understood that they have been presented by way of example, and not limitation. It will be apparent to persons skilled in the relevant art(s) that various changes in form, method and detail can be made therein without departing from the spirit and scope of the present invention. Thus, the present invention should not be limited by any of the above described exemplary aspects.

In addition, it should be understood that the figures in the attachments, which highlight the structure, methodology, functionality and advantages of the present invention, are presented for example purposes only. The present invention is sufficiently flexible and configurable, such that it may be deployed and implemented in ways other than that shown in the accompanying figures.

The invention claimed is:

1. A method of field management using a computer, said computer comprising a processor, memory and communications interface, said computer programmed to perform said method, said method comprising:
    receiving a request for an automated field management process via said communications interface, wherein said automated field management process directs, via said communications interface interfacing with a plurality of terminals, a plurality of users to perform a plurality of tasks;
    generating, in response to said request, at least one field management resource via said processor and memory;

receiving data associated with said at least one field management resource via said communications interface;
analyzing said data and said at least one field management resource via said processor and memory;
reporting at least one issue via said communications interface;
generating at least one field management report via said processor, memory and communications interface; and
synchronizing said data between a first terminal chosen from said plurality of terminals, a second terminal chosen from said plurality of terminals and a server, via said processor, memory and communications interface, said synchronizing comprises:
  identifying the portions of said data that are unsynchronized on said first terminal by examining at least one timestamp indicative of when said data was last changed on said first terminal and at least one timestamp indicative of when said data was last changed on said server;
  updating, on said server and said second terminal, said identified portions of said data that are unsynchronized; and
  updating, on said server, said at least one timestamp indicative of when said data was last changed on said server;
wherein said automated field management process is a predefined workflow requiring said plurality of users to perform said plurality of tasks in a specific order.

2. The method of claim 1, wherein said automated field management resource comprises at least one field management document.

3. The method of claim 2, wherein said field management document comprises at least one inspection checklist.

4. The method of claim 1, wherein said at least one field management resource comprises at least one standard information template.

5. The method of claim 1, wherein said at least one field management resource is context-specific.

6. The method of claim 1, further comprising selection of user-established rules, wherein said rules assist in:
receiving a request for an automated field management process via said communications interface;
generating at least one field management resource via said processor and memory;
receiving data associated with said at least one field management resource via said communications interface;
analyzing said data and said at least one field management resource via said processor and memory;
reporting at least one issue via said communications interface; and
generating at least one field management report via said processor, memory and communications interface.

7. The method of claim 1, wherein receiving a request for an automated field management process further comprises using an ID for identification of said automated field management process.

8. The method of claim 1, wherein said at least one field management resource further comprises user-established metrics and guidelines.

9. The method of claim 1, wherein generating at least one field management report further comprises notification of a plurality of interested parties utilizing one or more other terminals that said at least one field management report is available.

10. The method of claim 1, wherein said analyzing said data and said at least one field management resource comprises:
determining a congruence of said data with at least one pre-established metric describing a field management task.

11. The method of claim 1, wherein said reporting at least one issue comprises:
using information from said receiving data associated with said at least one field management resource and information from said analyzing said data and said at least one field management resource.

12. The method of claim 1, wherein said generating at least one field management report comprises:
using information from said receiving data associated with said at least one field management resource, information from said analyzing said data and said at least one field management resource, and information from said reporting at least one issue.

13. A computer program product comprising a non-transitory computer usable medium having control logic stored therein for causing a computer to facilitate field management processes, said control logic comprising:
first computer readable program code means for causing the computer to receive a request for an automated field management process, wherein said automated field management process directs, via interfacing with a plurality of terminals, a plurality of users to perform a plurality of tasks;
second computer readable program code means for causing the computer to generate, in response to said request, at least one field management resource;
third computer readable program code means for causing the computer to receive data associated with said at least one field management resource;
fourth computer readable program code means for causing the computer to analyze said data and said at least one field management resource;
fifth computer readable program code means for causing the computer to report at least one issue;
sixth computer readable program code means for causing the computer to generate at least one field management report; and
seventh computer readable program code means for causing the computer to synchronize said data between a first terminal chosen from said plurality of terminals, a second terminal chosen from said plurality of terminals and a server, wherein causing the computer to synchronize said data comprises:
  identifying the portions of said data that are unsynchronized on said first terminal by examining at least one timestamp indicative of when said data was last changed on said first terminal and at least one timestamp indicative of when said data was last changed on said server; and
  updating, on said server and said second terminal, said identified portions of said data that are unsynchronized; and
  updating, on said server, said at least one timestamp indicative of when said data was last changed on said server;
wherein said automated field management process is a pre-defined workflow requiring said plurality of users to perform said plurality of tasks in a specific order.

14. The computer program product of claim 13, wherein said automated field management resource comprises at least one field management document.

15. The computer program product of claim 14, wherein said at least one field management document comprises at least one inspection checklist.

16. The computer program product of claim 13, wherein said at least one field management resource comprises at least one standard information template.

17. The computer program product of claim 13, wherein said at least one field management resource comprises context-specific information.

18. The computer program product of claim 13, further comprising:
    eighth computer readable program code means for causing the computer to select user-established rules that assist said control logic in causing a computer to facilitate field management, said control logic comprising:
        first computer readable program code means for causing the computer to receive a request for an automated field management process;
        second computer readable program code means for causing the computer to generate at least one field management resource;
        third computer readable program code means for causing the computer to receive data associated with said at least one field management resource;
        fourth computer readable program code means for causing the computer to analyze said data and said at least one field management resource;
        fifth computer readable program code means for causing the computer to report at least one issue; and
        sixth computer readable program code means for causing the computer to generate at least one field management report.

19. The computer program product of claim 13, wherein receiving a request for an automated field management process further comprises using an ID for identification of said automated field management process.

20. The computer program product of claim 13, wherein said at least one field management resource further comprises user-established metrics and guidelines.

21. The computer program product of claim 13, wherein generating said at least one field management report further comprises control logic stored therein for causing said computer to notify a plurality of interested parties utilizing one or more other terminals that said at least one field management report is available.

22. The computer program product of claim 13, wherein said fourth computer readable program code means for causing the computer to analyze said data and said at least one field management resource, comprises:
    ninth computer readable program code means for causing the computer to determine a congruence of said data with at least one pre-established metric describing a field management task.

23. The computer program product of claim 13, wherein said fifth computer readable program code means for causing the computer to report at least one issue, comprises:
    tenth computer readable program code means for causing the computer to use information from said third computer readable program code means for causing the computer to receive data associated with said at least one field management resource and information from said fourth computer readable program code means for causing the computer to analyze said data and said at least one field management resource.

24. The computer program product of claim 13, wherein said sixth computer readable program code means for causing the computer to generate at least one field management report, comprises:
    eleventh computer readable program code means for causing the computer to use information from said third computer readable program code means for causing the computer to receive data associated with said at least one field management resource, information from said fourth computer readable program code means for causing the computer to analyze said data and said at least one field management resource, and information from said fifth computer readable program code means for causing the computer to report at least one issue.

25. A system for facilitating automated field management processes, said system comprising:
    at least one server, said at least one server comprising;
        a memory device;
        a communications interface, disposed in network communication with a plurality of terminals; and
        a processor disposed in communication with the memory device, wherein the processor is programmed to perform:
            receiving a request for an automated field management process via said communications interface, wherein said automated field management process directs, via said communications interface interfacing with said plurality of terminals, a plurality of users to perform a plurality of tasks;
            generating, in response to said request, at least one field management resource via said processor and memory device;
            receiving data associated with said at least one field management resource via said communications interface;
            analyzing said data and said at least one field management resource via said processor and memory device;
            reporting at least one issue via said communications interface;
            generating at least one field management report via said processor, memory and communications interface; and
            synchronizing said data between a first terminal chosen from said plurality of terminals, a second terminal chosen from said plurality of terminals and said server, said synchronizing comprises;
            identifying the portions of said data that are unsynchronized on said first terminal by examining at least one timestamp indicative of when said data was last changed on said first terminal and at least one timestamp indicative of when said data was last changed on said server;
            updating, on said server and said second terminal, said identified portions of said data that are unsynchronized; and
            updating, on said server, said at least one timestamp indicative of when said data was last changed on said server;
    wherein said automated field management process is a pre-defined specific order.

26. The system of claim 25, wherein an automated field management resource comprises at least one field management document.

27. The system of claim 26, wherein said at least one field management document comprises at least one inspection checklist.

28. The system of claim 25, wherein said at least one field management resource comprises at least one standard information template.

29. The system of claim 25, wherein said at least one field management resource comprises context-specific information.

30. The system of claim 25, further comprising said processor programmed to select user-established rules, wherein said rules assist in programming said processor to perform:
    receiving a request for an automated field management process via said communications interface;
    generating at least one field management resource via said processor and memory;
    receiving data associated with said at least one field management resource via said communications interface;
    analyzing said data and said at least one field management resource via said processor and memory;
    reporting at least one issue via said communications interface; and
    generating at least one field management report via said processor, memory and communications interface.

31. The system of claim 25, wherein receiving a request for said automated field management process further comprises using an ID for identification of said automated field management process.

32. The system of claim 25, wherein said at least one field management resource further comprises user-established metrics and guidelines.

33. The system of claim 25, wherein generating at least one field management report further comprises said processor operable to notify a plurality of interested parties utilizing one or more other terminals that a report is available.

34. The system of claim 25, wherein said analyzing said data and said at least one field management resource comprises:
    determining a congruence of said data with at least one pre-established metric describing a field management task.

35. The system of claim 25, wherein said reporting at least one issue comprises:
    using information from said receiving data associated with said at least one field management resource and information from said analyzing said data and said at least one field management resource.

36. The system of claim 25, wherein said generating at least one field management report comprises:
    using information from said receiving data associated with said at least one field management resource, information from said analyzing said data and said at least one field management resource, and information from said reporting at least one issue.

* * * * *